United States Patent [19]
Toda

[11] Patent Number: 5,526,405
[45] Date of Patent: Jun. 11, 1996

[54] CORDLESS TELEPHONE APPARATUS WITH A SPEAKERPHONE OPERATION MODE CORDLESS

[75] Inventor: Kozo Toda, Yokohama, Japan

[73] Assignee: Canon Kabushiki Kaisha, Tokyo, Japan

[21] Appl. No.: 158,367

[22] Filed: Nov. 29, 1993

Related U.S. Application Data

[63] Continuation of Ser. No. 802,485, Dec. 5, 1991, abandoned.

[30] Foreign Application Priority Data

Jan. 17, 1991 [JP] Japan ................................. 3-003864

[51] Int. Cl.⁶ ................................................ H04M 11/00
[52] U.S. Cl. ............................... 379/61; 379/58; 379/432
[58] Field of Search .................................. 379/58, 61, 432

[56] References Cited

U.S. PATENT DOCUMENTS

| | | | |
|---|---|---|---|
| 4,741,018 | 4/1988 | Potratz et al. | 379/58 |
| 4,969,181 | 11/1990 | Ito | 379/61 |
| 5,036,532 | 7/1991 | Metroka et al. | 379/58 |
| 5,073,928 | 12/1991 | Shimanuki | 379/61 |

OTHER PUBLICATIONS

Panasonic model KX-T3000 Cordlessphone, Operating instructions, Sep. 1988.

*Primary Examiner*—Dwayne D. Bost
*Assistant Examiner*—G. J. Oehling
*Attorney, Agent, or Firm*—Fitzpatrick, Cella, Harper & Scinto

[57] ABSTRACT

A cordless telephone includes a stand for a handset that receives voice signals via a radio network. The stand has a charging circuit. In a speaker-phone conversation mode, a speaker in the stand reproduces a received voice signal via a speaker-phone voice control unit.

6 Claims, 3 Drawing Sheets

CORDLESS TELEPHONE APPARATUS WITH A SPEAKERPHONE OPERATION MODE CORDLESS

This application is a continuation of application Ser. No. 07/802,485 filed Dec. 5, 1991, now abandoned.

BACKGROUND OF THE INVENTION

1. Field of the Invention

This invention relates to a cordless telephone apparatus having a handset with a radio communication function, and a stand for the handset.

2. Description of the Related Art

FIG. 3 is a diagram showing the schematic configuration of a conventional cordless telephone apparatus. In FIG. 3, there is shown a base set 1. A telephone line 3 is connected to the base set 1. An antenna 5 performs transmission/reception of radio signals with a handset 7. The base set 1 performs interface control with the telephone line 3 during conversation by the handset 7.

An antenna 9 performs transmission/reception of radio signals with the base set 1. The handset 7 comprises a microphone and a receiver operation unit, and is used by the operator for actual conversation.

When the operator engages in conversation, communication of data signals is first performed between the base set 1 and the handset 7 to confirm an ID (identification) code, to determine a channel to be used, and the like. According to this communication, a voice channel to be used is determined from among a plurality of voice channels, and voices are transmitted and received through the determined channel.

The operator's voice is transmitted from the handset 7 to the base set 1 through the transmitting voice channel, and is coupled from the base set 1 to the telephone line 3. A voice received from the telephone line 3 is transmitted from the base set 1 to the handset 7 through the receiving voice channel, and is heard by the operator.

Thus, the operator can engage in conversation over the telephone line 3 via a radio signal using the handset 7.

A charger 11 also functions as a stand for the handset 7. When the handset 7 is not used, a battery, serving as a power-supply unit for the handset 7, is charged by placing the handset 7 on the charger 11.

In the above-described conventional apparatus, since a radio signal is transmitted between the base set 1 and the handset 7, no cord curling occurs, and the handset 7 can be freely moved. However, it is always necessary to lift the handset 7 from the stand and to engage in conversation with the handset 7 close to the ear.

SUMMARY OF THE INVENTION

It is an object of the present invention to improve the operability of a cordless telephone apparatus.

It is another object of the present invention to reduce electric power consumed in a handset of a cordless telephone apparatus.

It is still another object of the present invention to reduce the weight of a handset of a cordless telephone apparatus.

The invention is directed to a stand for a handset that receives voice signals via a radio network. The stand includes a voice signal receiver in the handset and a speaker that reproduces the received voice signal.

These and other objects and features of the present invention will become more apparent from the following detailed description of the preferred embodiment taken in connection with the accompanying drawings.

DETAILED DESCRIPTION OF THE PREFERRED EMBODIMENT

Figure 1:
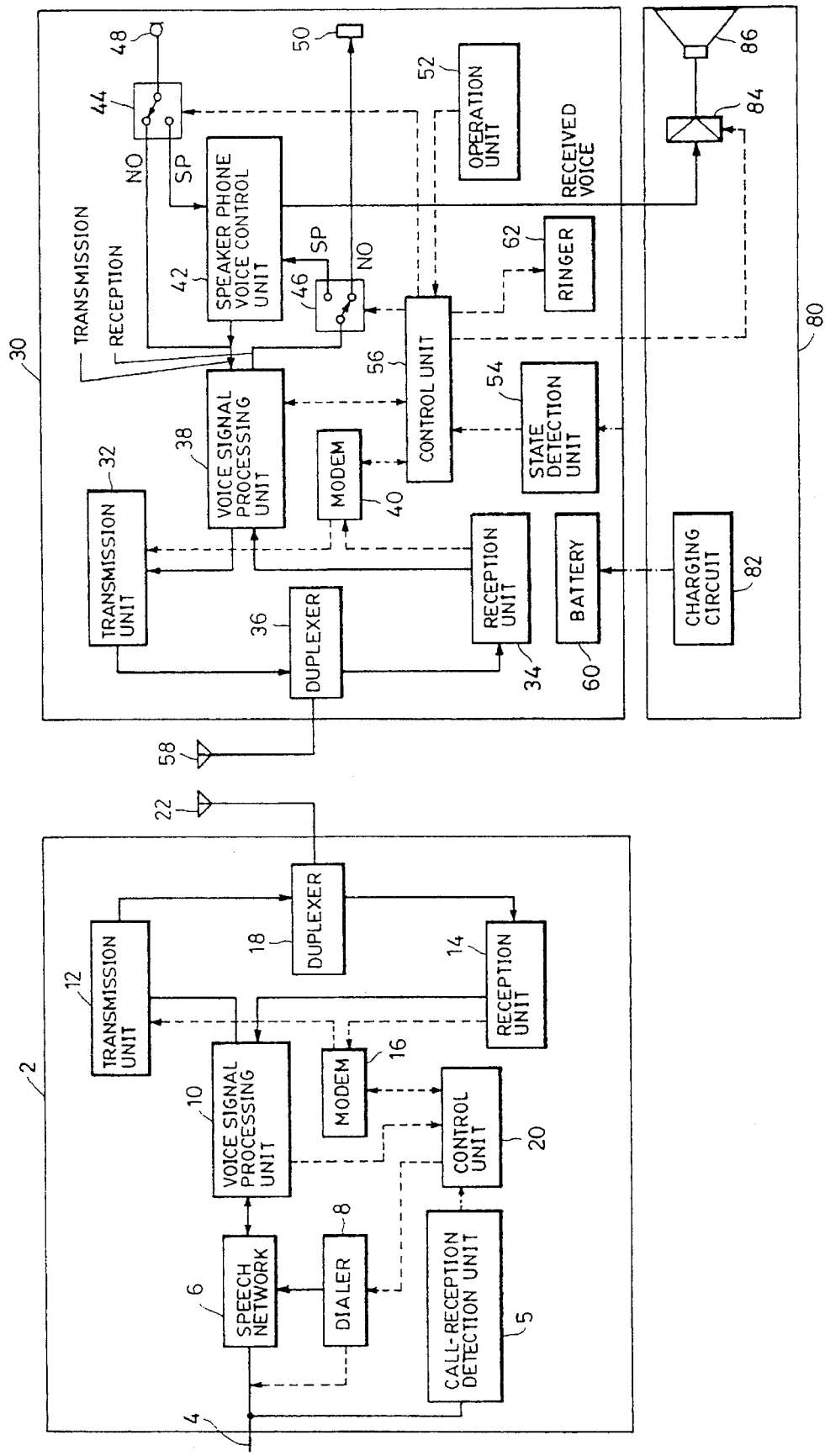
FIG. 1 is a block diagram of an apparatus according to an embodiment of the present invention.

FIG. 1 is a block diagram showing the configuration of a cordless phone according to an embodiment of the present invention.

In FIG. 1, there are shown a base set 2, a handset 30, and a stand 80 for the handset 30. Solid lines represent paths of voice signals, and broken lines represent paths of contol signals.

In the base set 2, a telephone line 4 is connected to the base set 2. A call-reception detection unit 5 detects call reception from the telephone line 4. A speech network 6 functions as an interface for voice to be transmitted and received voice with the telephone line 4. A dialer 8 generates a dial signal when calling is performed for the telephone line 4. A voice signal processing unit 10 performs modulation/demodulation of voice to be transmitted and received voice. A transmission unit 12 transmits data and voice to the handset 30. A reception unit 14 receives data and voice from the handset 30. A modem 16 performs modulation/demodulation of data communicated with the handset 30. A duplexer 18 separates voice to be transmitted to the handset 30 from signals received from the handset 30. A control unit 20 contols respective units within the base set 2. An antenna 22 performs transmission/reception with the handset 30.

In the handset 30, a transmission unit 32 transmits data and voice to the base set 2. A reception unit 34 receives data and voice from the base set 2. A duplexer 36 separates signals to be transmitted to the base set 2 from signals received from the base set 2. A voice signal processing unit 38 performs modulation/demodulation processing of voice to be transmitted and received voice. A modem 40 performs modulation/demodulation of data exchanged with the base set 2. A speaker phone voice control unit 42 performs voice control when conversation is performed in a speaker-phone (hands-free) state. A switch 44 switches a voice signal from a microphone 48. A switch 46 switches the received voice processed in the voice signal processing unit 38. The microphone 48 is used for voice transmission. A receiver 50 is used fop voice reception. An operation unit 52 is operated by the operator. A state detection unit 54 detects whether the handset 30 is placed on the stand 80 or is lifted therefrom. A control unit 56 controls respective units within the handset 30. An antenna 58 performs transmission/reception with the base set 2. A battery 60 serves as a power supply for the handset 30. A ringer 62 notifies the operator of a call from the telephone line 4.

In the stand 80, a charging circuit 82 charges the battery 60 within the handset 30. A speaker amplifier 84 amplifies a received voice during conversation in a speaker-phone (hands-free) state. There is also shown a speaker 86.

The handset 30 and the stand 80 are connected via contacts for a voice signal, a control signal and charging.

Figure 2:
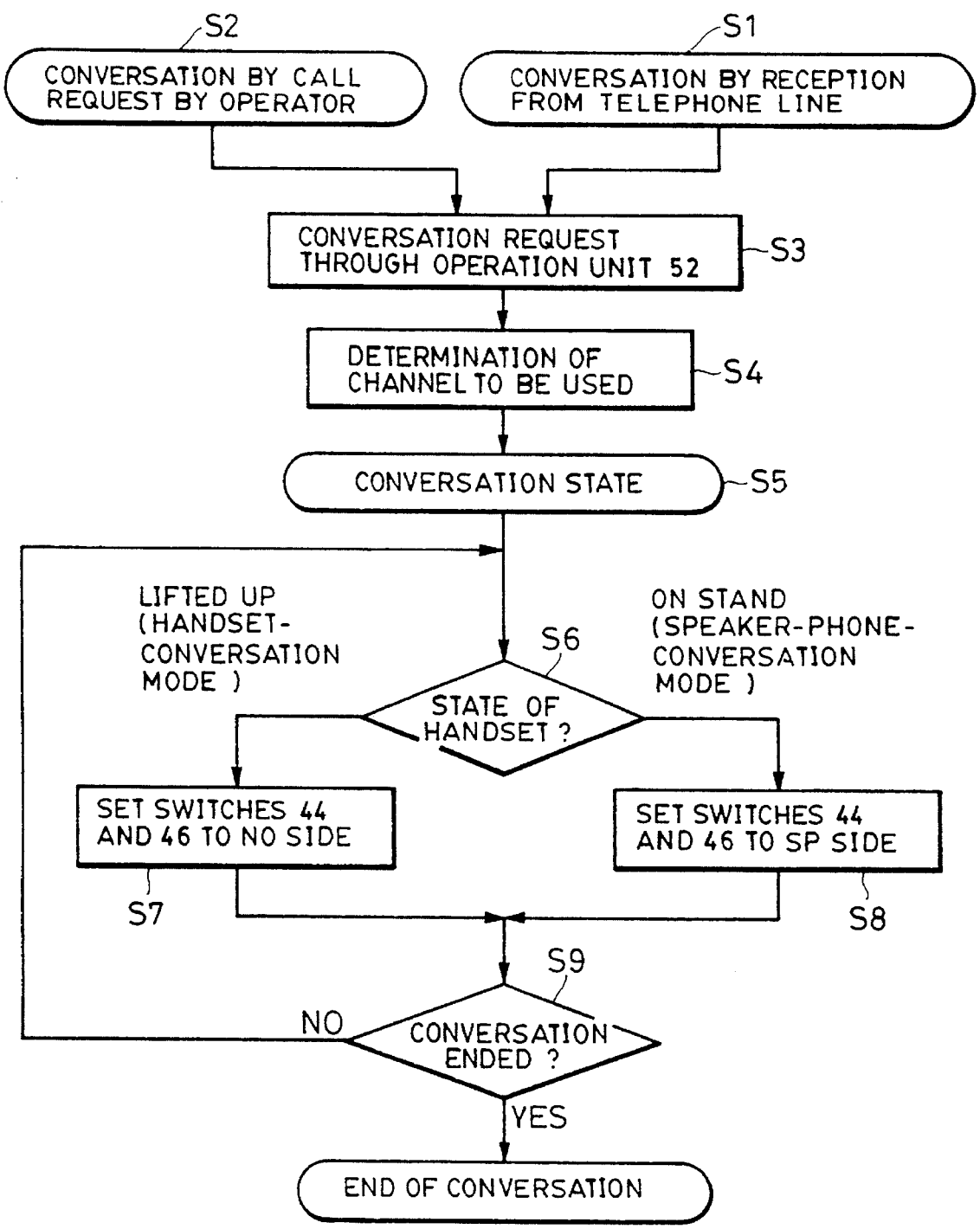
FIG. 2 is a flowchart illustrating processing in the embodiment shown in FIG. 1.
Figure 3:
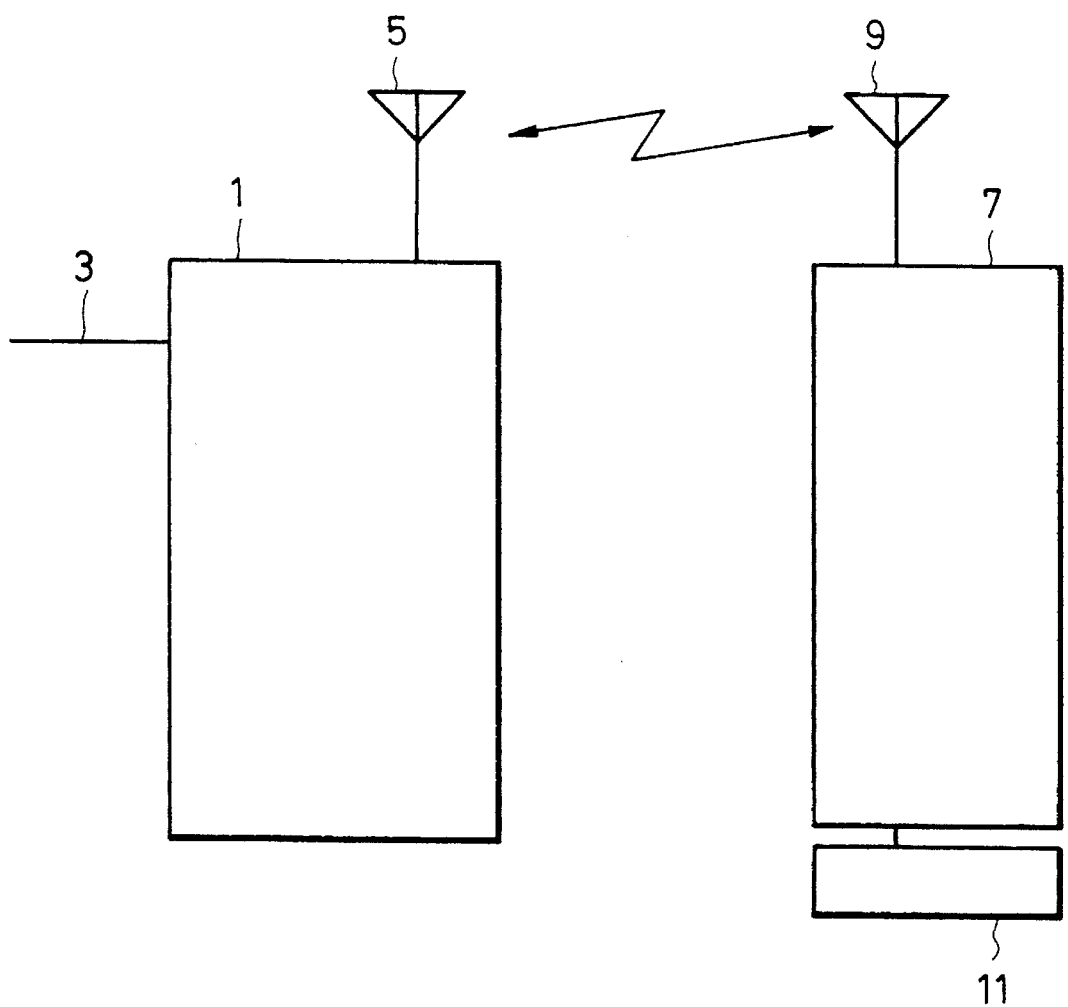
FIG. 3 is a block diagram of a conventional apparatus.

The operation in the above-described apparatus will now be explained with reference to FIG. 2.

First, the path of a data signal communicated between the base set 2 and the handset 30 will be explained.

That is, when a data signal is transmitted from the base set 2 to the handset 30, in the base set 2, the data signal is transmitted to the outside via the control unit 20, the modem 16, the transmission unit 12, the duplexer 18 and the antenna 22. This data signal is received by the control unit 56 of the handset 30 via the antenna 58, the duplexer 36, the reception unit 34, and the modem 40.

When a data signal is transmitted from the handset 30 to the base set 2, in the handset 30, the data signal is transmitted to the outside via the control unit 56, the modem 40, the transmission unit 32, the duplexer 36 and the antenna 58. This data signal is received at the control unit 20 of the base set 2 via the antenna 22, the duplexer 18, the reception unit 14 and the modem 16.

Next, the paths of voice signals between the base set 2 and the handset 30 will be explained.

That is, in the base set 2, voice received from the telephone line 4 is transmitted to the outside via the telephone line 4, the speech network 6, the voice signal processing unit 10, the transmission unit 12, the duplexer 18 and the antenna 22. This voice signal reaching the handset 30 is received via the antenna 58, the duplexer 36, the reception unit 34 and the voice signal processing unit (reception) 38.

A voice from the handset 30 is transmitted to the outside via the voice signal processing unit (transmission) 38, the transmission unit 32, the duplexer 36 and the antenna 58. This voice signal reaching the base set 2 is transmitted to the telephone line 4 via the antenna 22, the duplexer 18, the reception unit 14, the voice signal processing unit 10 and the speech network 6.

In this apparatus, when there is a call reception from the telephone line 4 (step S1), the call-reception detection unit 5 detects the call, and a data signal indicating "call reception from the telephone line" is transmitted via the above-described path of the data signal from the base set 2 to the handset 30. In recognizing this transmission, the control unit 56 rings the ringer 62 to notify the operator of the call reception.

When the operator requests conversation by operating the operation unit 52 (step S3), a data signal indicating the "conversation request" is transmitted via the aforementioned path of the data signal from the handset 30 to the base set 2. In recognizing this transmission, the control unit 20 performs inquiry of an ID code and determination of a voice channel to be used by communicating data signals with the base set 2 (step S4).

The processing of the conversation request from operating the operation unit 52 to the determination of a voice channel to be used is the same as when the operator arbitrarily requests calling and operates the operation unit 52 (step S2).

When the channel to be used has been determined, a voice conversation state is provided (step S5). In the voice conversation state, if a state wherein the handset 30 is lifted from the stand 80 (a usual state of use wherein the operator brings the handset 30 close to the ear) is detected by the state detection unit 54 (step S6), the control unit 56 sets the switches 44 and 46 to a No (normal) side, and conversation is performed (step S7).

That is, the voice of the operator is transmitted from the microphone 48 to the voice signal processing unit 38 via the switch 44, is further transmitted through the above-described path of the voice to be transmitted from the handset 30 to the base set 2, and is coupled to the telephone line 4.

A received voice from the telephone line 4 is transmitted to the voice signal processing unit 38 through the above-described path from the base unit 2 to the handset 30, and reaches the receiver 50 via the switch 46. Thus, the operator engages in conversation with a communication partner on the telephone line.

If the state detection unit 54 detects a state wherein the handset 30 is placed on the stand 80 in step S6, the control unit 56 sets the switches 44 and 46 to SP (speaker phone) side in step S8, and conversation is performed.

That is, the voice of the operator is transmitted from the microphone 48 to the speaker phone voice control unit 42 via the switch 44, and the voice received from the telephone line 4 is transmitted from the voice signal processing unit 38 to the speaker phone voice control unit 42 via the switch 46. The speaker phone voice control unit 42 compares the levels of the voice to be transmitted and the received voice, and determines the state of conversation. That is, if the level of the voice of the operator is higher than the level of the received voice, the received voice is muted (or reduced to a very low level) to provide a voice transmitting state, and the voice of the operator is transmitted from the speaker phone voice control unit 42 to the voice signal processing unit 38. The voice of the operator is transmitted to the outside via the antenna 88. If the level of the voice of the operator is lower than the level of the received voice, the voice of the operator is muted (or reduced to a very low level) to provide a voice receiving state, and the received voice from the antenna 88 is transmitted from the speaker phone voice control unit 42 to the speaker driver 84, where the voice is amplified to ring the speaker 86.

Thus, it becomes possible to perform a speaker-phone conversation (hands-free conversation) by an amplified received voice while howling is prevented.

The conversation is terminated according to an instruction from the operation unit 52 (step S9).

In the present embodiment, a handset-conversation mode and a speaker-phone-conversation mode are altenatively selected when the handset 30 is lifted from the stand 80 and when the handset 30 is placed on the stand 80, respectively. That is, the handset-conversation mode and the speaker-phone-conversation mode may be repeated any times.

While the present invention has been described with respect to what is presently considered to be the preferred embodiment, it is to be understood that the invention is not limited to the disclosed embodiment. The present invention is intended to cover various modifications and equivalent arrangements included within the spirit and scope of the appended claims.

What is claimed is:

1. A cordless telephone apparatus comprising:
   (A) a handset comprising:
      (a1) a microphone for inputting a user's voice and for converting said user's voice to a first voice signal;
      (a2) transmission means for transmitting said first voice signal input from said microphone, via a radio network to a base set;
      (a3) first reception means for receiving a second voice signal via the radio network from said base set; and
      (a4) a receiver for converting said second voice signal to a voice;
   (B) a charger stand for charging said handset comprising:
      (b1) second reception means for receiving said second voice signal from said first reception means;

(b2) a speaker for reproducing a voice from said second voice signal received by said second reception means; and (b3) a speaker driver for driving said speaker;

wherein said handset further comprises:

(a5) state detection means for detecting whether said handset is coupled to said charger stand;

(a6) switch means for switching between said receiver and said speaker;

(a7) handset control means for operating said switch means in accordance with an output of said state detection means, wherein when said handset is coupled to said charger stand, said handset control means causes said switch means to switch to said speaker to operate said cordless telephone apparatus in a speakerphone operation mode and when said handset is not coupled to said charger stand; causes said switch means to switch to said receiver to operate said cordless telephone apparatus in a handset operation mode; and (a8) speakerphone voice control means for reducing or muting the level of said second voice signal when the level of said first voice signal is greater than the level of said second voice signal, said speakerphone voice control means including providing means for providing said level controlled second voice signal to said speaker;

wherein said speaker and said receiver are selectively operated but said microphone is commonly used in both said speakerphone operation mode and said handset operation mode, and wherein said speakerphone voice control means is disabled when said receiver operation mode is selected.

2. A cordless telephone according to claim 1, wherein said handset further comprises a battery, and wherein said stand further comprises charging means for charging said battery.

3. A cordless telephone used with a stand for charging said cordless telephone, said cordless telephone comprising:

a microphone for inputting a user's voice and for converting said user's voice to a first voice signal;

transmission means for transmitting said first voice signal input from said microphone via a radio network to a base set;

receiving means for receiving a second voice signal received via the radio network from said base set;

a receiver for converting said second voice signal to a voice;

detection means for detecting that said telephone is coupled to said stand;

switch means for switching between said receiver and a speaker in said stand;

control means for operating said switch means in accordance with an output of said detection means, wherein when said telephone is coupled to said stand, said control means causes said switch means to switch to said speaker in said stand to operate said cordless telephone in a speakerphone operation mode and when said telephone is not coupled to said stand, causes said switch means to switch to said receiver to operate said cordless telephone in a receiver operation mode; and second control means for reducing or muting the level of said second voice signal when the level of said first voice signal is greater than the level of said second voice signal, said second control means including providing means for providing said level controlled second voice signal to said speaker in said stand;

wherein said speaker in said stand and said receiver in said cordless telephone are selectively operated but said microphone is commonly used in both said speakerphone operation mode and said receiver operation mode, and wherein said second control means is disabled in said receiver operation mode.

4. A cordless telephone apparatus according to claim 3, wherein said handset comprises a battery, and wherein said stand comprises charging means for charging said battery.

5. A method for operating a cordless telephone having a handset, including a microphone and a receiver, and a stand, for charging the handset and including a speaker, comprising the steps of:

in the handset:

inputting a user's voice to said microphone and converting the user's voice to a first voice signal;

transmitting said first voice signal via a radio network to a base set;

receiving a second voice signal received via the radio network from said base set;

detecting whether or not said handset is coupled to said stand;

switching between said receiver and said speaker in accordance with the step of detecting, wherein when said handset is coupled to said stand, said speaker in said stand is activated to operate said cordless telephone in a speakerphone operation mode and when said handset is not coupled to said stand, said receiver in said handset is activated to operate said cordless telephone in a handset operation mode;

converting, in said handset operation mode, said second voice signal to a voice and outputting said voice at said receiver;

reducing or muting, in said speakerphone operation mode, the level of said second voice signal when the level of said first voice signal is greater than the level of said second voice signal and providing said level controlled second voice signal to said speaker; and in the stand:

receiving said level controlled second voice signal from said handset; and reproducing said level controlled second voice signal at said speaker via a speaker driver, wherein, said speaker in said stand and said receiver in said handset are selectively operated but said microphone is commonly used in both said speakerphone operation mode and said handset operation mode, and wherein the controlling of the level of said second voice signal is disabled in said handset operation mode.

6. A method of operating a cordless telephone apparatus used with a stand, for charging the cordless telephone, comprising the steps of:

inputting a user's voice to and converting the user's voice to a first voice signal in a microphone of said cordless telephone;

transmitting, from said cordless telephone, said first voice signal via a radio network to a base set;

receiving a second voice signal at said cordless telephone via the radio network from said base set;

detecting, by said cordless telephone, whether or not said cordless telephone is placed on said stand;

switching, by said cordless telephone; a voice transmission path so that said second voice signal is reproduced from a speaker in said stand when said detecting means detects that said cordless telephone is placed on said stand, thereby enabling a speakerphone operation mode;

switching, by said cordless telephone, said voice transmission path so that said second voice signal is reproduced from said receiver in said cordless telephone when said detecting means does not detect that said cordless telephone is placed on said stand, thereby enabling a receiver operation mode;

reducing or muting, by said cordless telephone in said speakerphone operation mode, the level of said second voice signal when the level of said first voice signal is greater than the level of said second voice signal and providing said level controlled second voice signal to said speaker;

wherein, the speaker in said stand and said receiver in said cordless telephone are selectively operated but said microphone is commonly used in both said speakerphone operation mode and said receiver operation mode, and wherein the controlling of the level of said second voice signal is disabled in said receiver operation mode.

* * * * *

UNITED STATES PATENT AND TRADEMARK OFFICE
CERTIFICATE OF CORRECTION

PATENT NO. : 5,526,405
DATED      : June 11, 1996
INVENTOR   : KOHZO TODA

Page 1 of 2

It is certified that error appears in the above-identified patent and that said Letters Patent is hereby corrected as shown below:

ON THE TITLE PAGE, ITEM

[54] TITLE

"CORDLESS" (2nd occurrence) should be deleted.

On THE TITLE PAGE, ITEM [56], FOREIGN PATENT DOCUMENTS

Insert --FOREIGN PATENT DOCUMENTS  2197166  5/1988
        Great Britain--.

COLUMN 1

Line 3, "CORDLESS" should be deleted.

COLUMN 2

Line 55, "fop" should read --for--.

COLUMN 4

Line 40, "altenatively" should read --alternatively--.

UNITED STATES PATENT AND TRADEMARK OFFICE
CERTIFICATE OF CORRECTION

PATENT NO. : 5,526,405

DATED : June 11, 1996

INVENTOR : KOHZO TODA

Page 2 of 2

It is certified that error appears in the above-identified patent and that said Letters Patent is hereby corrected as shown below:

COLUMN 5

Line 16,   "stand;" should read --stand,--;
    Line 33,   "telephone" should read --telephone apparatus--.

COLUMN 6

Line 7,    "apparatus" should be deleted.
    Line 65,   "telephone;" should read --telephone,--.

Signed and Sealed this

Twenty-first Day of January, 1997

Attest:

BRUCE LEHMAN

Attesting Officer        Commissioner of Patents and Trademarks